US012637905B2

(12) United States Patent
Sorg

(10) Patent No.: US 12,637,905 B2
(45) Date of Patent: May 26, 2026

(54) DEFORMABLE SCREEN

(71) Applicant: Suman Sorg, Washington, DC (US)

(72) Inventor: Suman Sorg, Washington, DC (US)

( * ) Notice: Subject to any disclaimer, the term of this patent is extended or adjusted under 35 U.S.C. 154(b) by 290 days.

(21) Appl. No.: 18/323,319

(22) Filed: May 24, 2023

(65) Prior Publication Data

US 2023/0383600 A1 Nov. 30, 2023

Related U.S. Application Data

(60) Provisional application No. 63/365,250, filed on May 24, 2022.

(51) Int. Cl.
*E06B 9/52* (2006.01)
*E06B 9/00* (2006.01)
*E06B 9/24* (2006.01)

(52) U.S. Cl.
CPC *E06B 9/52* (2013.01); *E06B 9/00* (2013.01); *E06B 9/24* (2013.01); *E06B 2009/527* (2013.01)

(58) Field of Classification Search
None
See application file for complete search history.

(56) References Cited

U.S. PATENT DOCUMENTS 1,055,489 A * 3/1913 Pendery .................... E06B 9/52 160/381
2,207,381 A * 7/1940 Lang .......................... E06B 9/52 160/381
2,266,235 A * 12/1941 Mollard .................... E06B 3/28 52/211
2,597,484 A * 5/1952 Heilig ....................... E06B 9/52 160/381
2,718,423 A * 9/1955 Eaddy ....................... E06B 9/52 292/256
2,935,771 A * 5/1960 Hatcher, Jr. ........... E06B 7/2309 49/495.1
3,116,746 A * 1/1964 Bird ......................... E04H 15/22 135/97
3,214,879 A * 11/1965 Ellingson, Jr. ............ E06B 3/28 49/490.1
4,040,210 A * 8/1977 Land .......................... E06B 9/24 160/90
4,599,825 A * 7/1986 Sixsmith ................. E06B 7/231 49/499.1

(Continued)

FOREIGN PATENT DOCUMENTS

AU 2010207879 A1 9/2011
BE 904190 A * 5/1986 ............... E06B 9/52

(Continued)

OTHER PUBLICATIONS

International Search Report and Written Opinion for International Application No. PCT/US2023/023429, dated Oct. 11, 2023, 10 pages.

*Primary Examiner* — Phi D A
(74) *Attorney, Agent, or Firm* — Lisa D. Fazzino; Ryan L. Marshall; Barnes & Thornburg LLP

(57) ABSTRACT

A deformable screen adapted for mounting in an opening of a building includes at least one sheet of netting and a frame. The frame includes an inflatable tube coupled to and surrounding an outer perimeter of the at least one sheet of netting and is adjustable between an inflated-use mode and deflated-storage mode.

19 Claims, 5 Drawing Sheets

(56) References Cited

U.S. PATENT DOCUMENTS

| | | | | |
|---|---|---|---|---|
| 4,682,443 | A | 7/1987 | Demo | |
| 5,007,212 | A * | 4/1991 | Fritts | E04H 15/20 52/2.18 |
| 5,392,835 | A | 2/1995 | Wildt | |
| 5,535,808 | A | 7/1996 | Idesis et al. | |
| 5,937,586 | A * | 8/1999 | Scherba | E04H 17/18 52/2.21 |
| 6,209,598 | B1 * | 4/2001 | Petrey | G09F 7/002 160/368.1 |
| 6,282,843 | B1 * | 9/2001 | Shibaike | E04H 15/20 52/88 |
| 6,926,062 | B2 * | 8/2005 | Neumann | B60J 7/223 296/180.1 |
| 7,252,484 | B1 * | 8/2007 | Crumpley | F04B 17/06 417/234 |
| 8,171,681 | B2 * | 5/2012 | Miller | E06B 9/02 52/2.14 |
| 8,572,911 | B1 * | 11/2013 | Binienda | E06B 9/00 52/2.16 |
| 9,255,438 | B2 * | 2/2016 | Pardue | E06B 7/2318 |
| 10,081,980 | B2 * | 9/2018 | Birkert | E06B 9/04 |
| 11,578,517 | B2 * | 2/2023 | Martin | E05C 17/36 |
| 11,788,318 | B2 * | 10/2023 | Klappe | E04H 15/20 52/2.23 |
| 12,071,809 | B2 * | 8/2024 | Lee | E06B 7/231 |
| 2002/0100221 | A1 * | 8/2002 | Williams | E04D 13/033 52/200 |
| 2002/0184841 | A1 | 12/2002 | Diamond | |
| 2004/0253919 | A1 * | 12/2004 | Dube | F24F 11/0001 454/274 |
| 2008/0017229 | A1 * | 1/2008 | Brewin | E04B 1/169 52/2.25 |
| 2009/0195014 | A1 | 8/2009 | Gathman | |
| 2010/0200034 | A1 | 8/2010 | Miller | |
| 2011/0078963 | A1 | 4/2011 | Pardue et al. | |
| 2016/0265274 | A1 * | 9/2016 | Rapp | E06B 9/52 |
| 2022/0056760 | A1 * | 2/2022 | Altieri, Jr. | E06B 9/52 |

FOREIGN PATENT DOCUMENTS

| | | | | |
|---|---|---|---|---|
| CN | 2799826 | Y | 7/2006 | |
| CN | 201258677 | Y | 6/2009 | |
| CN | 208534382 | U | 2/2019 | |
| DE | 3811257 | A1 | 10/1989 | |
| DE | 20307766 | U1 | 10/2003 | |
| DE | 102008025290 | A1 * | 12/2009 | E06B 9/522 |
| DE | 102023121843 | A1 * | 2/2025 | E06B 9/52 |
| EP | 1581716 | B1 | 5/2010 | |
| KR | 200336008 | Y1 * | 12/2003 | E06B 9/52 |
| KR | 100999051 | B1 * | 12/2010 | E06B 9/06 |
| KR | 20130121302 | A * | 11/2013 | E06B 9/52 |
| KR | 101788778 | B1 * | 10/2017 | E06B 9/522 |
| KR | 20230085271 | A * | 6/2023 | E06B 7/22 |
| WO | 2004031522 | A1 | 4/2004 | |

* cited by examiner

DEFORMABLE SCREEN

CROSS-REFERENCE TO RELATED APPLICATIONS

This application claims the benefit and priority under 35 U.S.C. § 119(e) to U.S. Provisional Patent Application Ser. No. 63/365,250, filed May 24, 2022, which is herein incorporated by reference in its entirety.

FIELD OF DISCLOSURE

The present disclosure relates generally to deformable screens and more specifically to deformable screens adapted for mounting in an opening of a building.

BACKGROUND

This disclosure refers to deformable screens, and more particularly, to deformable screens adapted for mounting in an opening of a building.

Netting and screens help protect building inhabitants from insects, such as malaria-carrying mosquitos. Such netting or screens often cover windows or building doorways. Some netting and screens are used as bed nets that cover an individual while sleeping. Such netting or screens, however, may not be securely positioned in an opening or over a bed, allowing various openings for mosquitos or other insects to ingress into an area of the building. Such netting or screens may also easily tear, creating openings for mosquitos or other insects. Thus, the number of incidences of malaria increases despite utilizing netting or screens.

Studies have shown that important features of netting or screens to prevent mosquito or insect ingress include physical integrity, consistent use, and population-level coverage. Therefore, there exists a need for an affordable, low-cost screen that prevents ingress of insects or mosquitos into a building. It is an object of the present disclosure to provide a deformable screen that allows an inhabitant of a building to securely mount the deformable screen in an opening of a building regardless of geometry of the opening to reduce incidences of malaria or other mosquito and other bug-carried illnesses.

SUMMARY

The present disclosure may comprise one or more of the following features and combinations thereof.

According to an illustrative aspect of the present disclosure, a deformable screen adapted for mounting in an opening of a building includes at least one sheet of netting and a frame. The frame includes an inflatable tube and at least one friction strip. The inflatable tube is coupled to and surrounds an outer perimeter of the at least one sheet of netting. The at least one friction strip is attached to at least a portion of an outer perimeter of the inflatable tube to hold the frame in place within the opening.

The frame is adjustable between an inflated-use mode and a deflated-storage mode. In the inflated-use mode, the inflatable tube is filled with a fluid so that when the deformable screen is installed in an opening of a building the outer surface of the inflatable tube is in confronting relation with an inside perimeter of the opening. In the deflated-storage mode, the inflatable tube is without fluid so that the frame is collapsible for storage.

In some embodiments, the inflatable tube is formed to include a groove which receives at least a portion of the outer perimeter of the at least one sheet of netting. In some embodiments, the at least one sheet of netting is coupled to the groove with heat infusion.

In some embodiments, the inflatable tube includes a valve that receives and exhausts the fluid so that the frame can be adjusted between the deflated-storage mode and the inflated-use mode. In some embodiments, the at least one sheet of netting is a flexible material. In some embodiments, the at least one sheet of netting is a first material and the inflatable tube is a second material. The first material and the second material are each treated with a chemical, insect repellant. In some embodiments, the deformable screen further includes a flap attached to the frame that extends from the frame to the inside perimeter of the opening when the deformable screen is installed in the opening.

In some embodiments, the at least one friction strip includes two friction strips. In some embodiments, an edge of one of the two friction strips is perpendicular to an edge of the other of the two friction strips. In some embodiments, an edge of one of the two friction strips is not perpendicular to an edge of the other of the two friction strips.

In some embodiments, the frame includes a flange coupled to at least a portion of the outer perimeter of the inflatable tube. The flange is also configurable with a fastener to couple the deformable screen to a structure of the building. In some embodiments, the flange is formed to include a fastener aperture. The fastener is received within the fastener aperture. In some embodiments, the fastener can be tied to the structure of a building.

In some embodiments, the inflatable tube includes at least two dividers. The at least two dividers are integrally coupled to an inner perimeter of the inflatable tube. The at least two dividers also cooperate to define at least one chamber inward of the inner perimeter of the inflatable tube and between the at least two dividers. A first chamber of the at least one chamber is defined between a first divider and a second divider of the at least two dividers so that a portion of the inflatable tube is defined by the first chamber. Likewise, a second chamber of the at least one chamber is defined between the second divider and the first divider so that a second, separate portion of the inflatable tube is defined by the second chamber. In some embodiments, each divider includes at least one self-sealing valve configured so that the first chamber remains inflated in the inflated-use mode when the second chamber is punctured.

According to another illustrative aspect of the present disclosure, a deformable screen adapted for mounting in an opening of a building includes at least one sheet of netting and a frame. The frame includes an inflatable tube and a flange coupled to at least a portion of an outer perimeter of the inflatable tube. The flange is also configurable with a fastener to couple the deformable screen to a structure of the building.

The frame is adjustable between an inflated-use mode and a deflated-storage mode. In the inflated-use mode, the inflatable tube is filled with a fluid so that when the deformable screen is installed in an opening of a building the outer surface of the inflatable tube is in confronting relation with an inside perimeter of the opening. In the deflated-storage mode, the inflatable tube is without fluid so that the frame is collapsible for storage.

In some embodiments, the inflatable tube is formed to include a groove which receives at least a portion of the outer perimeter of the at least one sheet of netting. In some embodiments, the at least one sheet of netting is coupled to the groove with heat infusion.

In some embodiments, the inflatable tube includes a valve that receives and exhausts the fluid so that the frame can be adjusted between the deflated-storage mode and the inflated-use mode. In some embodiments, the at least one sheet of netting is a flexible material. In some embodiments, the at least one sheet of netting is a first material and the inflatable tube is a second material. The first material and the second material are each treated with a chemical, insect repellant. In some embodiments, the deformable screen further includes a flap attached to the frame that extends from the frame to the inside perimeter of the opening when the deformable screen is installed in the opening.

In some embodiments, the frame includes at least one friction strip attached to the outer perimeter of the inflatable tube to hold the frame in place with the opening when the deformable screen is installed in the opening. In some embodiments, the at least one friction strips includes two friction strips. In some embodiments, an edge of one of the two friction strips is perpendicular to an edge of the other of the two friction strips. In some embodiments, an edge of one of the two friction strips is not perpendicular to an edge of the other of the two friction strips.

In some embodiments, the flange is formed to include a fastener aperture. The fastener is received within the fastener aperture. In some embodiments, the fastener can be tied to the structure of the building.

In some embodiments, the inflatable tube includes at least two dividers. The at least two dividers are integrally coupled to an inner perimeter of the inflatable tube. The at least two dividers also cooperate to define at least one chamber inward of the inner perimeter of the inflatable tube and between the at least two dividers. A first chamber of the at least one chamber is defined between a first divider and a second divider of the at least two dividers so that a portion of the inflatable tube is defined by the first chamber. Likewise, a second chamber of the at least one chamber is defined between the second divider and the first divider so that a second, separate portion of the inflatable tube is defined by the second chamber. In some embodiments, each divider includes at least one self-sealing valve configured so that the first chamber remains inflated in the inflated-use mode when the second chamber is punctured.

These and other features of the present disclosure will become more apparent from the following description of the illustrative embodiments.

DETAILED DESCRIPTION OF THE DRAWINGS

Figure 1:
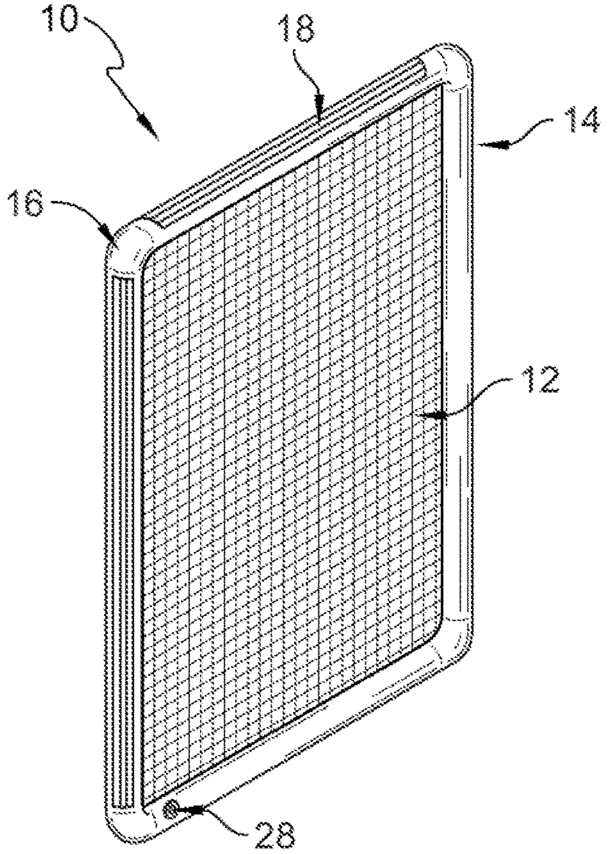
FIG. 1 is a perspective view of a deformable screen adapted for mounting in an opening of a building, the deformable screen having at least one sheet of netting and a frame.

For the purposes of promoting an understanding of the principles of the disclosure, reference will now be made to a number of illustrative embodiments illustrated in the drawings and specific language will be used to describe the same.

Figure 2:
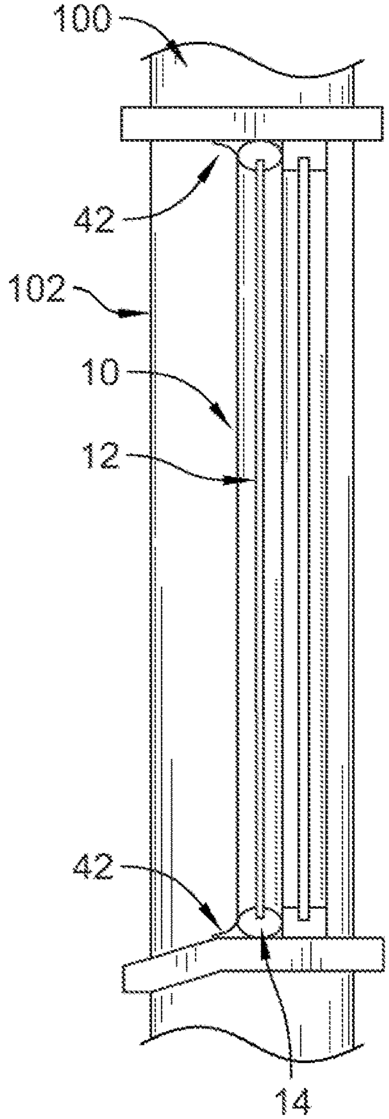
FIG. 2 is a side view of the deformable screen of FIG. 1 installed in an opening of a building, specifically a window.
Figure 3:
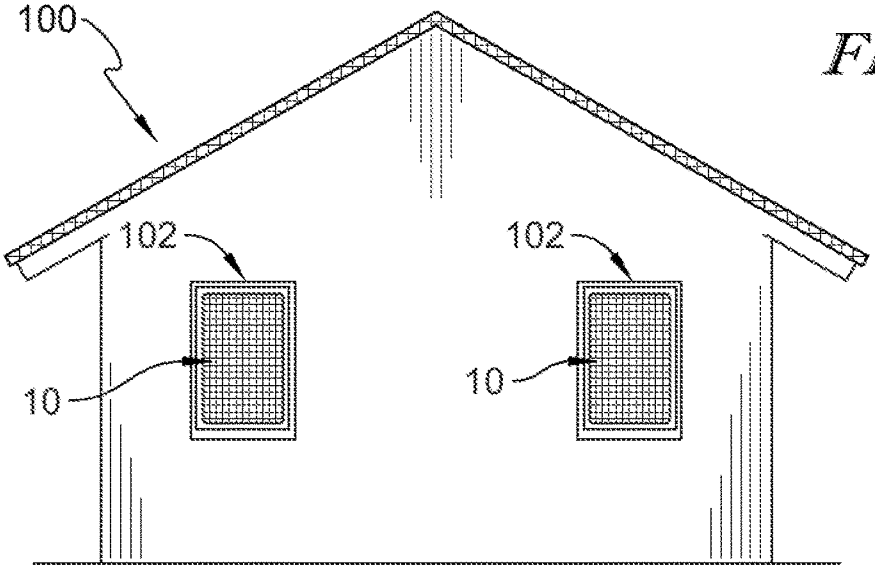
FIG. 3 is a front view of two deformable screens of FIG. 1 installed in openings of a building.
Figure 7:
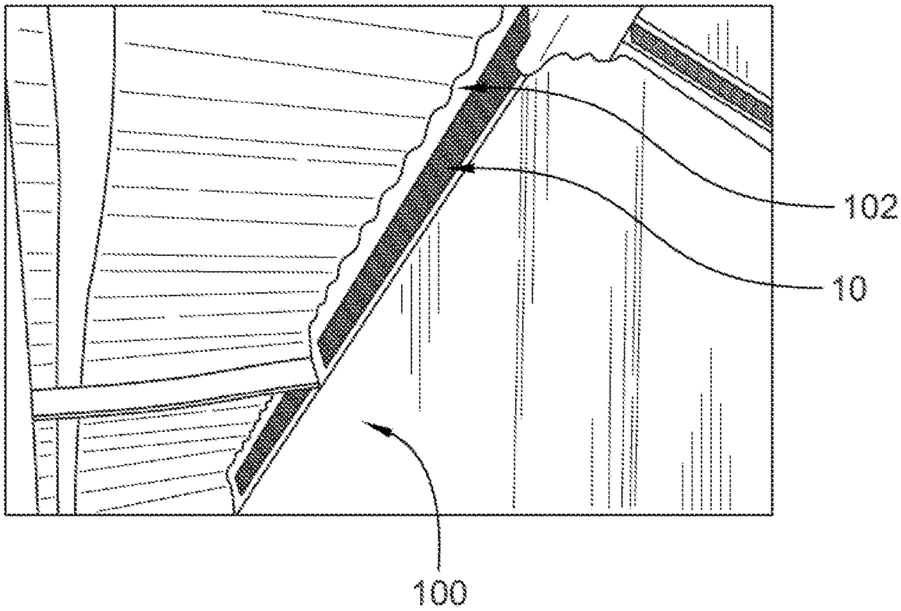
FIG. 7 is a perspective view of the deformable screen of FIG. 1 installed in an opening of a building, specifically an eave.

An illustrative deformable screen 10 is shown in FIG. 1. The deformable screen 10 is adapted for mounting in an opening 102 of a building 100, as shown in FIGS. 2, 3, and 7. For example, an opening 102 may include a window, a doorway, an eave, a space between at least two structural members of the building 100, such as below a roof of a thatched-roof home, and/or any other openings in the building 100. The building 100 may be any erected structure suitable for human occupancy, such as a house, including a thatched-roof house, an outhouse, an office, and/or a public building. The opening 102 includes an inside perimeter 106, and the deformable screen 10 is adapted to mount inside the opening 102 according to the dimensions and geometry of the inside perimeter 106.

The deformable screen 10 includes at least one sheet of netting 12 and a frame 14, as shown in FIG. 1. The at least one sheet of netting 12 is configured to prevent ingress of debris and/or insects, such as mosquitos, and more particularly mosquitos carrying malaria. The frame 14 is configured to hold the at least one sheet of netting 12 and to mount inside the opening 102 in an inflated-use mode, as shown in FIG. 2. The at least one sheet of netting 12 may be a mesh or screen material. In some embodiments, the at least one sheet of netting 12 may be a flexible material. In the illustrative embodiment, the deformable screen 10 includes only one sheet of netting 12. The deformable screen 10 may have more than one sheet of netting 12 in other embodiments. In such embodiments, each sheet of netting 12 may include a different pattern so that when each sheet of netting 12 is layered over the others a direct path of ingress for debris and/or insects is prevented. The materials of the at least one sheet of netting 12 and/or the components of the frame 14 may be treated with a chemical, insect repellant in some embodiments.

Figure 4A:
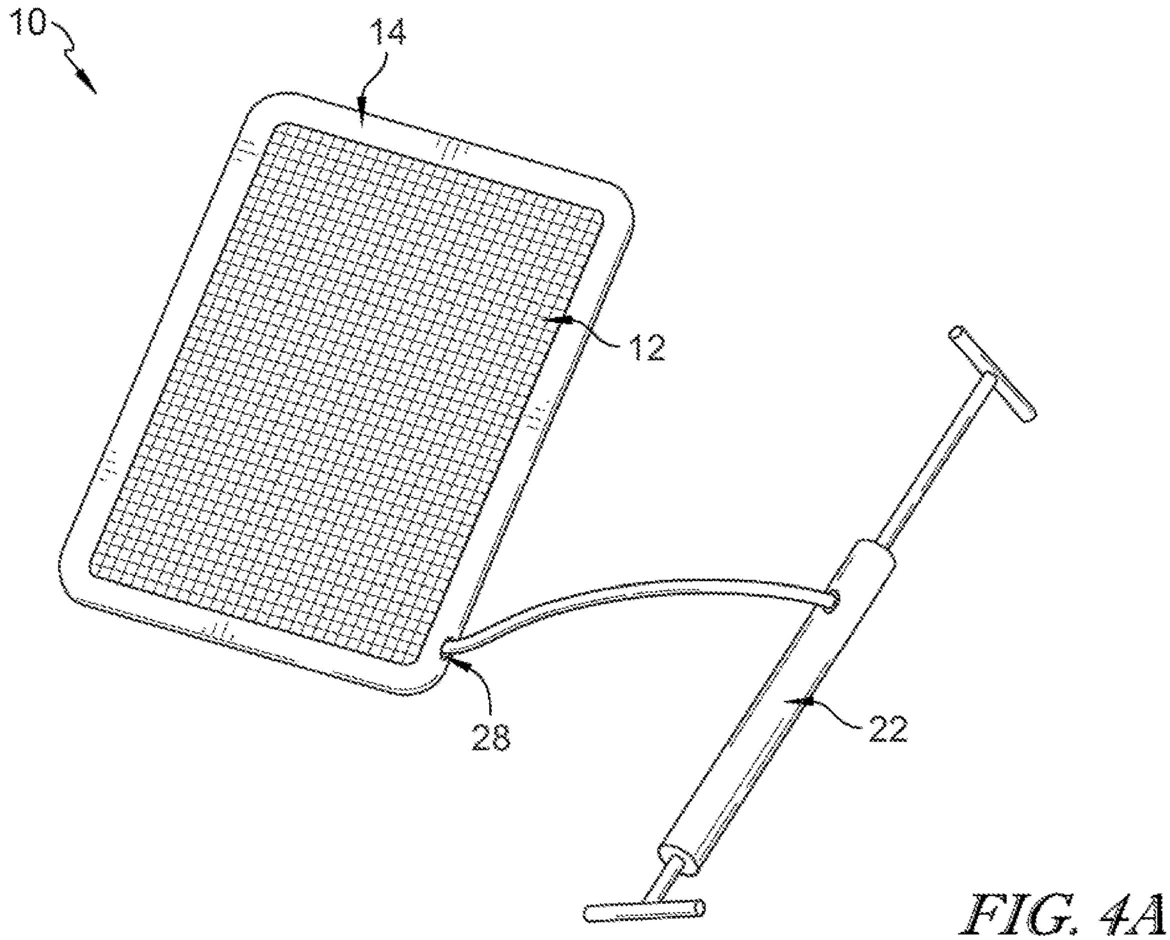
FIG. 4A is a perspective view of the deformable screen of FIG. 1 showing the deformable screen in a deflated-storage mode.
Figure 4B:
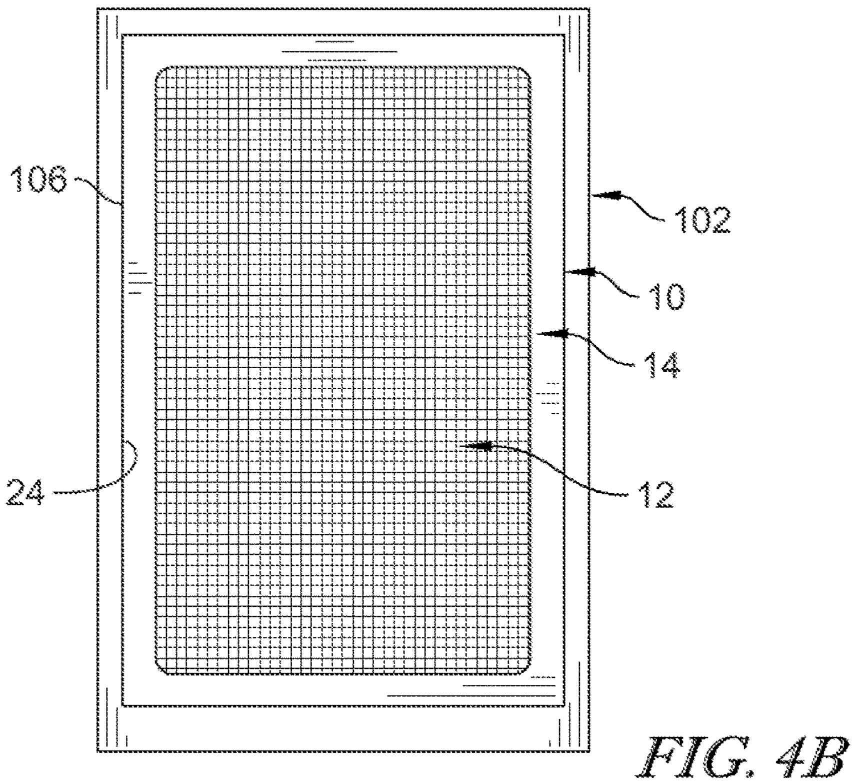
FIG. 4B is a front view of the deformable screen of FIG. 4A showing the deformable screen in an inflated-use mode.

The frame 14 is adjustable between a deflated-storage mode, as shown in FIG. 4A, and the inflated-use mode, as shown in FIG. 4B. The frame 14 includes an inflatable tube 16 and at least one friction strip 18, as shown in FIG. 1. The inflatable tube 16 is configured to receive and exhaust a fluid when the frame 14 is adjusted between the deflated-storage mode and the inflated-use mode. A friction strip 18 is configured to frictionally engage with at least a portion of the inside perimeter 106 of the opening 102. In the illustrative embodiment, the fluid is air. In the inflated-use mode, the inflatable tube 16 is filled with the fluid so that at least a portion of an outer perimeter 24 of the inflatable tube 16 is in confronting relation with at least a portion of the inside perimeter 106 of the opening 102, as shown in FIG. 4B. In the deflated-storage mode, the inflatable tube 16 is at least partially without the fluid so that the frame 14 is collapsible or foldable for storage.

Figure 5:
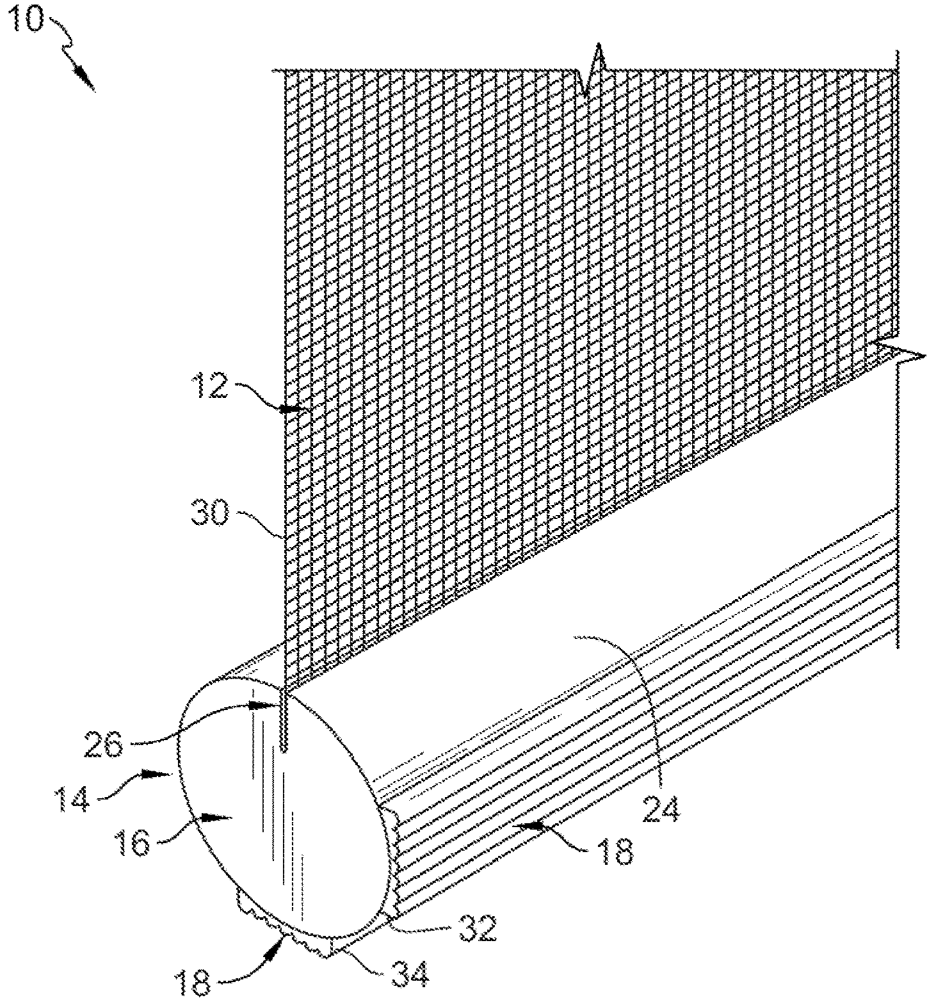
FIG. 5 is a cutaway view of the deformable screen of FIG. 1 showing that the frame of the deformable screen includes an inflatable tube formed to include a groove and having at least one friction strip.

The inflatable tube 16 is also formed to include a groove 26 and a valve or nozzle 28, as shown in FIGS. 1 and 5. The groove 26 is configured to receive at least a portion of an outer perimeter 30 of the at least one sheet of netting 12. The valve 28 is configured to receive and exhaust the fluid between the inflated-use mode and the deflated-storage mode. The at least one sheet of netting 12 may be coupled to or attached within the groove 26 by heat infusion in some embodiments. In other embodiments, the at least one sheet of netting 12 may be coupled to or attached within the groove 26 by glue, stitching, or other techniques to secure the at least one sheet of netting 12 within the groove 26. The valve 28 may be positioned anywhere on the inflatable tube 16. As shown in FIG. 4A, in some embodiments, the valve 28 may be adapted to receive air from a standard air pump unit 22, such as a manual bike pump, a hand or foot operated air pump, or an automatic air pump.

The at least one friction strip 18 includes two friction strips 18 in the embodiment shown in FIGS. 1 and 5. In other embodiments, the at least one friction strip 18 may be one friction strip 18 or more than two friction strips 18. In some embodiments, the at least one friction strip 18 may extend along one side of the outer perimeter 24 of the inflatable tube 16. The at least one friction strip 18 may extend along multiple sides of the outer perimeter 24 of the inflatable tube 16 or around the entire outer perimeter 24 of the inflatable tube 16. An edge 32 of one friction strip 18 may be perpendicular to an edge 34 of a different, separate friction strip 18 when the deformable screen 10 is in the inflated-use mode, as shown in FIG. 5. In other embodiments, the edge 32 may not be perpendicular to the edge 34. In the inflated-use mode, the at least one friction strip 18 is in confronting relation with at least a portion of the inside perimeter 106 of the opening 102.

In some embodiments, the deformable screen 10 may further include a flap 42 configured to cover at least some of the space between the frame 14 and the opening 102 of the building 100 as shown in FIG. 2. The flap 42 is coupled to or attached to the frame 14 and extends from the frame 14 to the opening 102. In some embodiments, the flap 42 is made of rubber.

A deformable screen 210 in accordance with another embodiment of the present disclosure is shown in FIGS. 6-9. Deformable screen 210 is substantially similar to deformable screen 10. Accordingly, the disclosure of deformable screen 10 is incorporated by reference except for the differences explicitly described below.

Figure 6:
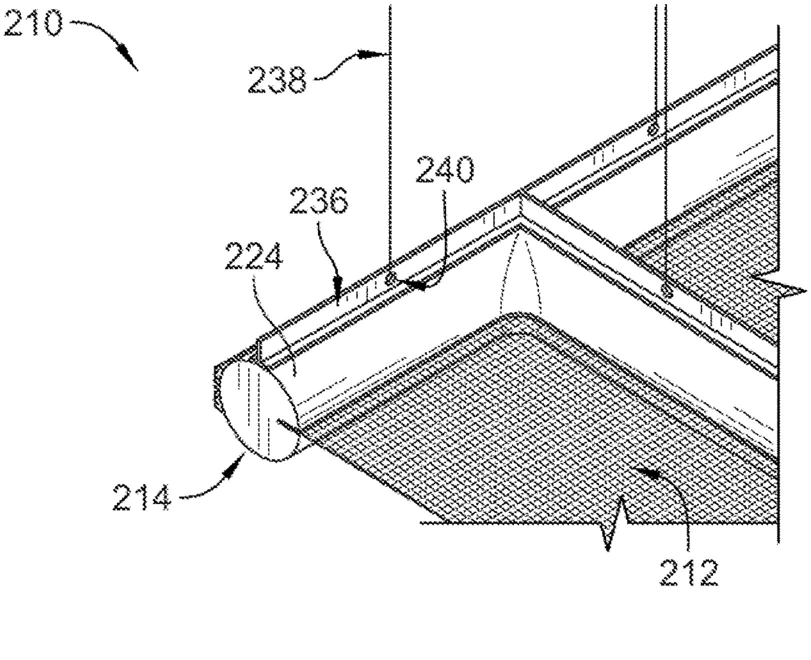
FIG. 6 is a cutaway view of another embodiment of a deformable screen similar to the deformable screen of FIG. 1 showing the deformable screen having at least one sheet of netting and a frame, and showing the frame having an inflatable tube, at least one friction strip, and a flange.
Figure 8:
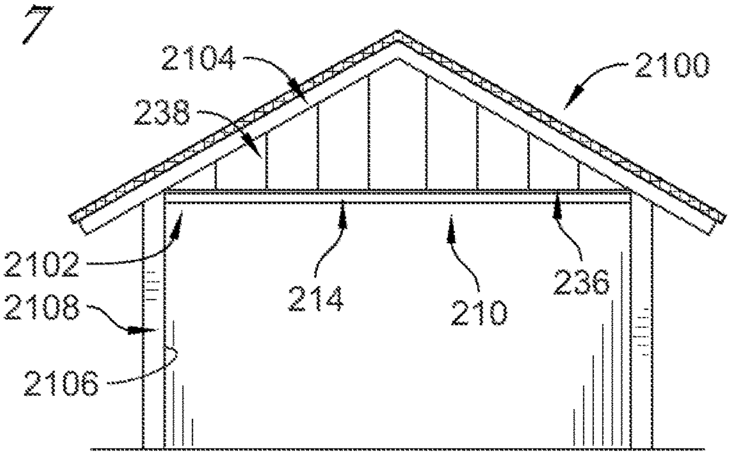
FIG. 8 is a cutaway view of the deformable screen of FIG. 6 showing the deformable screen installed within an opening of a building between a roof and a structure of the building.

Deformable screen 210 includes at least one sheet of netting 212 and a frame 214. The frame 214 of deformable screen 210 may also include a flange 236 coupled to at least a portion of the outer perimeter 224 of the inflatable tube 216, as shown in FIG. 6. The flange 236 may be configurable with a fastener 238 to couple the deformable screen 210 to a structure 2104 and/or the opening 2102 of the building 2100, as shown in FIG. 8. The flange 236 may also be formed to include a fastener aperture 240 configured to receive the fastener 238. In some embodiments, the fastener 238 may tie to the structure 2104 and/or the opening 2102 of the building 2100. The fastener 238 may be a wire, a thread, a string, or other means capable of tying to the structure 2104 and/or the opening 2102. In other embodiments, the fastener 238 may secure to the structure 2104 and/or the opening 2102 of the building 2100 by other means, including but not limited to glue, tape, screw(s), nail(s), and/or pin(s).

Figure 9:
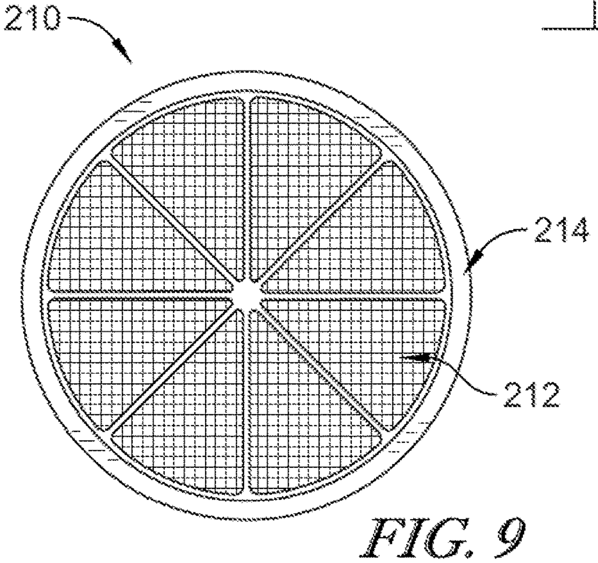
FIG. 9 is a top view of the installed deformable screen of FIG. 8.

Deformable screen 210 may be arranged, for example, to secure to a roof structure 2104 of the building 2100, as shown in FIG. 8, so that the frame 214 in the inflated-use mode is in confronting relation with the inside perimeter 2106 formed by walls 2108 of the building. In some embodiments, deformable screen 210 may have a circular arrangement, as shown in FIG. 9. In other embodiments, deformable screen 210 may have an arrangement suitable for any geometry or dimensions of a building 2100.

Figure 10:
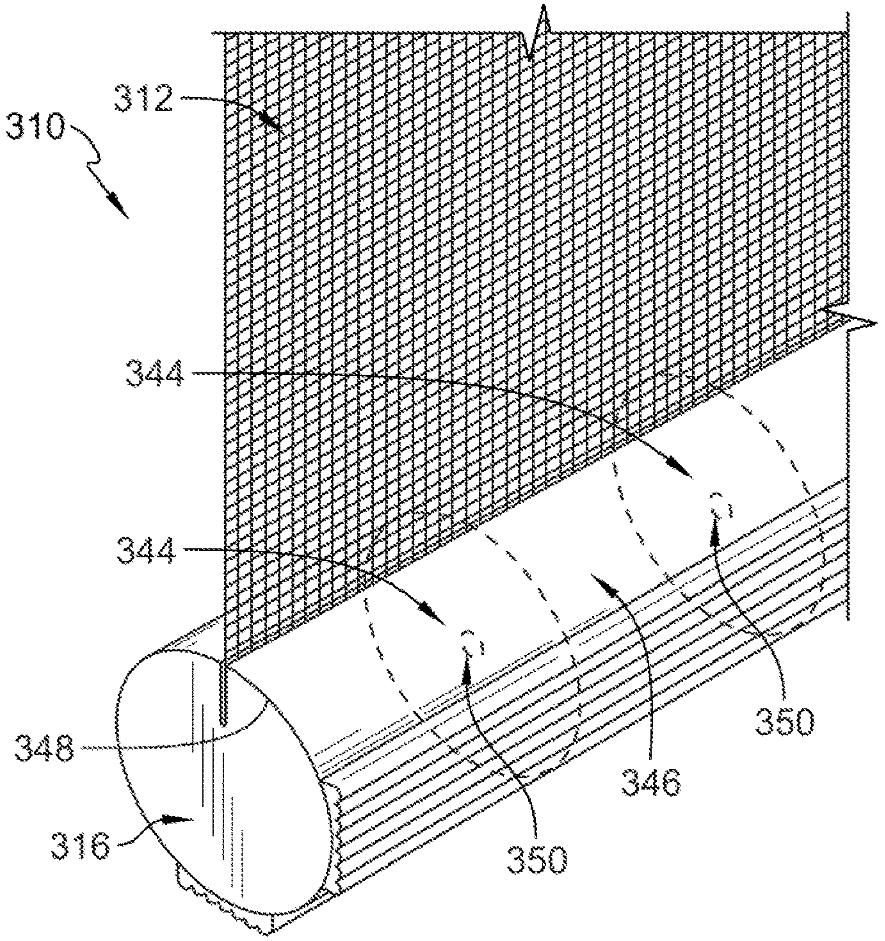
FIG. 10 is a cutaway view of another embodiment of a deformable screen similar to the deformable screen of FIG. 1 showing the deformable screen having at least one sheet of netting and a frame having an inflatable tube, and showing that the inflatable tube includes at least two dividers each having a valve to define at least one chamber.
Figure 11:
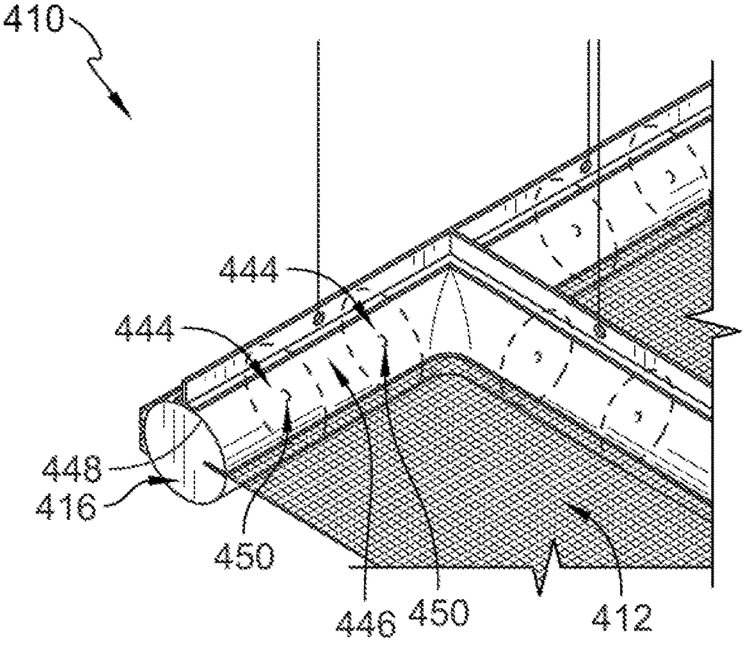
FIG. 11 is a cutaway view of another embodiment of a deformable screen similar to the deformable screen of FIG. 1 showing the deformable screen having at least one sheet of netting and a frame having an inflatable tube and a flange, and showing that the inflatable tube includes at least two dividers each having a valve to define at least one chamber.

Deformable screens 310 and 410 in accordance with a third and fourth embodiment of the present disclosure are shown in FIGS. 10 and 11, respectively. Deformable screens 310 and 410 are substantially similar to deformable screens 10 and 210, respectively. Accordingly, the disclosures of deformable screens 10 and 210 are incorporated by reference except for the differences explicitly described below.

Deformable screen 310/410 includes at least one sheet of netting 312/412 and a frame 314/414 having an inflatable tube 316/416. The inflatable tube 316/416 of deformable screen 310/410 may include at least two dividers 344/444 which cooperate to define at least one chamber 346/446, as shown in FIGS. 10 and 11. The at least two dividers 344/444 are integrally coupled to an inner perimeter 348/448 of the inflatable tube 316/416. The at least one chamber 346/446 is defined inward of the inner perimeter 348/448 and between the at least two dividers 344/444. In some embodiments, as shown in FIG. 11, the at least one chamber 446 may be defined between more than two dividers 444.

Each divider 344/444 may include at least one valve 350/450 configured to seal so that a first chamber 346/446 of the at least one chamber 346/446 remains inflated in the inflated-use mode when a second chamber 346/446 of the at least one chamber 346/446 is punctured, thereby causing the second chamber 346/446 to lose the fluid and deflate. Thus, if one chamber 346/446 is punctured, the remaining chambers 346/446 remain inflated.

Existing netting used to prevent insect ingress, such as mosquito netting, may have a limiting effect in keeping insects from entering a space because of tears and holes in the netting which allows for insect ingress. Furthermore, existing windows and screens used to prevent insect ingress may be ineffective due to cracks and gaps between the window and/or screen and the walls of a building which allow for entry of mosquitos and/or other insects. Such cracks and gaps may also cause issues for air infiltration, especially in colder climates.

Solutions which exist to seal cracks and gaps between a window and/or screen and the walls of a building include using sealants or caulk, which expand to fill the cracks and gaps. These are expensive to install, require special electric equipment, may be made of toxic plastic materials, do not weather well, and require reapplication. Thus, there exists a need for a deformable screen 10, 210, 310, 410 which prevents insects and/or mosquitos from entering a building

100, 2100 in the first place that snugly fits into window openings 102, eaves 102, ceilings 2102, and other gaps and cracks in a building 100, 2100 and can be installed using inexpensive materials. For example, a manual bicycle pump 22 may be used to inflate the frame 14, 214, 314, 414.

The frame 14, 214, 314, 414 may be inflated before or after installation into the opening 102, 2102. The frame 14, 214, 314, 414 allows for the snug fit into the opening 102, 2102 by adjusting and adapting to uneven surfaces. The screen 12, 212, 312, 412 which is held by the frame 14, 214, 314, 414 likewise is made of flexible material and may be heat-fused onto the frame 14, 214, 314, 414 to avoid any gaps between the frame 14, 214, 314, 414 and the screen 12, 212, 312, 412.

The limited components of the deformable screen 10, 210, 310, 410 may allow for a reduced difficulty and cost of production, which may thereby lead to an affordable deformable screen 10, 210, 310, 410. The deformable screen 10, 210, 310, 410 is also adaptable for a variety of openings 102, 2102 and may be simple to install. The variety of openings 102, 2102 may include windows 102, eaves 102, and any other openings in a building 100, 2100 where mosquitos and insects may be able to enter the building 100, 2100. The deformable screen 10, 210, 310, 410 may be installed by placing the deformable screen 10, 210, 310, 410 within the opening 102, 2102 and inflating it with a standard air pump 22 until it has firmly sealed the gaps around the opening 102, 2102. The deformable screen 10, 210, 310, 410 may also include a friction strip 18 to hold the deformable screen 10, 210, 310, 410 in place within the opening 102, 2102. The deformable screen 10, 210, 310, 410 may be adapted to any location around the building 100, 2100 to prevent mosquito ingress.

In some embodiments, the deformable screen 10, 210, 310, 410 may be adapted to be installed below a roof 2104. For example, thatched-roof homes 100, 2100 may be vulnerable to mosquitos due to the gaps found between straw that is used to cover the roof 2104. Therefore, deformable screen 210, 310, 410 may be installed below the roof and/or between structural members to provide protection from mosquitos entering the building 100, 2100 through gaps found in the roof 2104. Deformable screen 10, 210, 310, 410 may be tied to the roof structure 2104 to support deformable screen 10, 210, 310, 410.

The deformable screen 10, 210, 310, 410 of the present embodiment is adaptable for install in buildings 100, 2100 made of clay brick, rammed earth, cement blocks, or any other material.

Further embodiments of the disclosure are set out in the following numbered clauses:

1. A deformable screen adapted for mounting in an opening of a building comprising at least one sheet of netting, a frame including (i) an inflatable tube coupled to and surrounding an outer perimeter of the at least one sheet of netting, and (ii) at least one friction strip attached to at least a portion of an outer perimeter of the inflatable tube to hold the frame in place within the opening, wherein the frame is adjustable between an inflated-use mode in which the inflatable tube is filled with a fluid so that when the deformable screen is installed in an opening of a building the outer surface of the inflatable tube is in confronting relation with an inside perimeter of the opening and a deflated-storage mode in which the inflatable tube is without fluid so that the frame is collapsible for storage.
2. The deformable screen of clause 1, wherein the inflatable tube is formed to include a groove configured to receive at least a portion of the outer perimeter of the at least one sheet of netting.
3. The deformable screen of any one of clauses 1 and 2, wherein the at least one sheet of netting is coupled to the groove with heat infusion.
4. The deformable screen of any one of clauses 1 to 3, wherein the inflatable tube includes a valve configured to receive and exhaust the fluid so that the frame can be adjusted between the deflated-storage mode and the inflated-use mode.
5. The deformable screen of any one of clauses 1 to 4, wherein the at least one friction strip includes two friction strips.
6. The deformable screen of any one of clauses 1 to 5, wherein an edge of one of the two friction strips is perpendicular to an edge of the other of the two friction strips.
7. The deformable screen of any one of clauses 1 to 6, wherein an edge of the one of the two friction strips is not perpendicular to an edge of the other of the two friction strips.
8. The deformable screen of any one of clauses 1 to 7, wherein the at least one sheet of netting is a flexible material.
9. The deformable screen of any one of clauses 1 to 8, wherein the frame includes a flange coupled to at least a portion of the outer perimeter of the inflatable tube and configurable with a fastener to couple the deformable screen to a structure of the building.
10. The deformable screen of any one of clauses 1 to 9, wherein the flange is formed to include a fastener aperture, and wherein the fastener is received within the aperture.
11. The deformable screen of any one of clauses 1 to 10, wherein the fastener is configured to tie to the structure of the building.
12. The deformable screen of any one of clauses 1 to 11, wherein the at least one sheet of netting is a first material and the inflatable tube is a second material, and wherein one or more of the first material and the second material are treated with a chemical, insect repellant.
13. The deformable screen of any one of clauses 1 to 12, wherein the inflatable tube includes at least two dividers integrally coupled to an inner perimeter of the inflatable tube.
14. The deformable screen of any one of clauses 1 to 13, wherein the at least two dividers cooperate to define at least one chamber inward of the inner perimeter of the inflatable tube and between the at least two dividers.
15. The deformable screen of any one of clauses 1 to 14, wherein a first chamber of the at least one chamber is defined between a first divider and a second divider of the at least two dividers so that a first portion of the inflatable tube is defined by the first chamber, and wherein a second chamber of the at least one chamber is defined between the second divider and the first divider so that a second, separate portion of the inflatable tube is defined by the second chamber.
16. The deformable screen of any one of clauses 1 to 15, wherein each divider includes at least one self-sealing valve configured so that the first chamber remains inflated in the inflated-use mode when the second chamber is punctured.
17. The deformable screen of any one of clauses 1 to 16, wherein the deformable screen further includes a flap attached to the frame that extends from the frame to the inside perimeter of the opening when the deformable screen is installed in the opening.

18. A deformable screen adapted for mounting in an opening of a building comprising at least one sheet of netting, a frame including (i) an inflatable tube coupled to and surrounding an outer perimeter of the at least one sheet of netting, and (ii) a flange coupled to at least a portion of an outer perimeter of the inflatable tube and configurable with a fastener to couple the deformable screen to a structure of a building, wherein the frame is adjustable between an inflated-use mode in which the inflatable tube is filled with a fluid so that when the deformable screen is installed in an opening of a building the outer perimeter of the inflatable tube is in confronting relation with an inside perimeter of the opening and a deflated-storage mode in which the inflatable tube is without fluid so that the frame is collapsible for storage.

19. The deformable screen of clause 18, wherein the inflatable tube is formed to include a groove configured to receive at least a portion of the outer perimeter of the at least one sheet of netting.

20. The deformable screen of any one of clauses 18 and 19, wherein the at least one sheet of netting is coupled to the groove with heat infusion.

21. The deformable screen of any one of clauses 18 to 20, wherein the inflatable tube includes a valve configured to receive and exhaust the fluid so that the frame can be adjusted between the deflated-storage mode and the inflated-use mode.

22. The deformable screen of any one of clauses 18 to 21, wherein the frame includes at least one friction strip attached to the outer perimeter of the inflatable tube to hold the frame in place with the opening when the deformable screen is installed in the opening.

23. The deformable screen of any one of clauses 18 to 22, wherein the at least one friction strip includes two friction strips.

24. The deformable screen of any one of clauses 18 to 23, wherein an edge one of the two friction strips is perpendicular to an edge of the other of the two friction strips.

25. The deformable screen of any one of clauses 18 to 24, wherein an edge of the one of the two friction strips is not perpendicular to an edge of the other of the two friction strips.

26. The deformable screen of any one of clauses 18 to 25, wherein the at least one sheet of netting is a flexible material.

27. The deformable screen of any one of clauses 18 to 26, wherein the flange is formed to include a fastener aperture, and wherein the fastener is received within the aperture.

28. The deformable screen of any one of clauses 18 to 27, wherein the fastener is configured to tie to the structure of the building.

29. The deformable screen of any one of clauses 18 to 28, wherein the at least one sheet of netting is a first material and the inflatable tube is a second material, and wherein at least one of the first material and the second material are treated with a chemical, insect repellant.

30. The deformable screen of any one of clauses 18 to 29, wherein the inflatable tube includes at least two dividers integrally coupled to an inner perimeter of the inflatable tube.

31. The deformable screen of any one of clauses 18 to 30, wherein the at least two dividers cooperate to define at least one chamber inward of the inner perimeter of the inflatable tube and between the at least two dividers.

32. The deformable screen of any one of clauses 18 to 31, wherein a first chamber of the at least one chamber is defined between a first divider and a second divider of the at least two dividers so that a first portion of the inflatable tube is defined by the first chamber, and wherein a second chamber of the at least one chamber is defined between the second divider and the first divider so that a second, separate portion of the inflatable tube is defined by the second chamber.

33. The deformable screen of any one of clauses 18 to 32, wherein each divider includes at least one self-sealing valve configured so that the first chamber remains inflated in the inflated-use mode when the second chamber is punctured.

34. The deformable screen of any one of clauses 18 to 33, wherein the deformable screen further includes a flap attached to the frame that extends from the frame to the inside perimeter of the opening when the deformable screen is installed in the opening.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A deformable screen adapted for mounting in an opening of a building comprising:

at least one sheet of netting, and a frame including (i) an inflatable tube coupled to and surrounding an outer perimeter of the at least one sheet of netting, and (ii) at least one friction strip attached to at least a portion of an outer perimeter of the inflatable tube configured to hold the frame in place within the opening, wherein the frame is adjustable between an inflated-use mode in which the inflatable tube is filled with a fluid so that when the deformable screen is installed in an opening of a building the outer surface of the inflatable tube is in confronting relation with an inside perimeter of the opening and a deflated-storage mode in which the inflatable tube is without fluid so that the frame is collapsible for storage, wherein the inflatable tube is formed to include a recessed groove configured to receive at least a portion of the outer perimeter of the at least one sheet of netting, such that the portion of the outer perimeter of the netting is within the outer perimeter of the inflatable tube.

2. The deformable screen of claim 1, wherein the at least one friction strip comprises multiple ridges.

3. The deformable screen of claim 2, wherein the at least one sheet of netting is coupled to the groove with heat infusion.

4. The deformable screen of claim 1, wherein the inflatable tube includes a valve configured to receive and exhaust the fluid so that the frame can be adjusted between the deflated-storage mode and the inflated-use mode.

5. The deformable screen of claim 1, wherein the at least one friction strip includes two friction strips attached to the same section of the outer perimeter of the inflatable tube.

6. The deformable screen of claim 5, wherein an edge of one of the two friction strips is perpendicular to an edge of the other of the two friction strips.

7. The deformable screen of claim 5, wherein an edge of the one of the two friction strips is not perpendicular to an edge of the other of the two friction strips.

8. The deformable screen of claim 1, wherein the at least one sheet of netting is a flexible material configured to expand to fill the deformable screen in the inflated-use mode.

9. The deformable screen of claim 1, wherein the frame further comprises a flange coupled to at least a portion of the outer perimeter of the inflatable tube and configurable with a fastener to couple the deformable screen to a structure of the building.

10. The deformable screen of claim 9, wherein the flange is formed to include a fastener aperture, and wherein the fastener is received within the aperture.

11. The deformable screen of claim 10, wherein the flange comprises a surface having a width from the outer perimeter of the inflatable tube to a parallel edge of the flange that is substantially wider than the diameter of the inflatable tube.

12. A deformable screen adapted for mounting in an opening of a building comprising:

at least one sheet of netting, a frame including (i) an inflatable tube coupled to and surrounding an outer perimeter of the at least one sheet of netting, and (ii) a flange coupled to at least a portion of an outer perimeter of the inflatable tube and configurable with a fastener to couple the deformable screen to a structure of a building, wherein the flange comprises a surface having a width from the outer perimeter of the inflatable tube to a parallel edge of the flange and wherein the surface is perpendicular to the opening of a building and a flap attached to the frame that extends from the frame to the inside perimeter of the opening when the deformable screen is installed in the opening;

wherein the frame is adjustable between an inflated-use mode in which the inflatable tube is filled with a fluid so that when the deformable screen is installed in an opening of a building the outer perimeter of the inflatable tube is in confronting relation with an inside perimeter of the opening and a deflated-storage mode in which the inflatable tube is without fluid so that the frame is collapsible for storage.

13. The deformable screen of claim 12, wherein the frame comprises a plurality of friction strips attached to the outer perimeter of the inflatable tube to hold the frame in place within the opening when the deformable screen is installed in the opening.

14. The deformable screen of claim 12, wherein the at least one sheet of netting is a flexible material configured to expand to fill the deformable screen in the inflated-use mode.

15. The deformable screen of claim 12, wherein the flange is formed to include a fastener aperture, and wherein the fastener is received within the aperture.

16. The deformable screen of claim 12, wherein the at least one sheet of netting is a first material and the inflatable tube is a second material, and wherein at least one of the first material and the second material are treated with a chemical, insect repellent.

17. The deformable screen of claim 12, wherein the inflatable tube includes at least two dividers integrally coupled to an inner perimeter of the inflatable tube, wherein the at least two dividers cooperate to define at least one chamber inward of the inner perimeter of the inflatable tube and between the at least two dividers, and wherein a first chamber of the at least one chamber is defined between a first divider and a second divider of the at least two dividers so that a first portion of the inflatable tube is defined by the first chamber, and wherein a second chamber of the at least one chamber is defined between the second divider and the first divider so that a second, separate portion of the inflatable tube is defined by the second chamber.

18. The deformable screen of claim 17, wherein each divider includes at least one self-sealing valve configured so that the first chamber remains inflated in the inflated-use mode when the second chamber is punctured.

19. The deformable screen of claim 12, wherein the frame comprises one or more friction strips attached to the outer perimeter of the inflatable tube configured to hold the frame in place within the opening when the deformable screen is in the inflated-use mode and installed in the opening.

* * * * *